US010427490B2

(12) United States Patent
Contento et al.

(10) Patent No.: US 10,427,490 B2
(45) Date of Patent: Oct. 1, 2019

(54) ROOFTOP AIR CONDITIONING UNIT FOR BUSES

(71) Applicants: DENSO THERMAL SYSTEMS S.p.A., Poirino (Turin) (IT); DENSO CORPORATION, Kariya, Aichi-pref. (JP)

(72) Inventors: Leone Contento, Poitino (IT); Massimo Di Tonno, Poirino (IT); Tsutomu Makino, Kariya (JP); Eiji Oguri, Kariya (JP); Tosiaki Okamoto, Kariya (JP)

(73) Assignees: DENSO THERMAL SYSTEMS S.P.A., Poirino, (Turin) (IT); DENSO CORPORATION, Kariya, Aichi-pref. (JP)

( * ) Notice: Subject to any disclaimer, the term of this patent is extended or adjusted under 35 U.S.C. 154(b) by 371 days.

(21) Appl. No.: 14/597,243

(22) Filed: Jan. 15, 2015

(65) Prior Publication Data

US 2015/0202942 A1    Jul. 23, 2015

(30) Foreign Application Priority Data

Jan. 20, 2014   (IT) .............................. TO2014A0031

(51) Int. Cl.
   *B60H 1/00*   (2006.01)

(52) U.S. Cl.
   CPC ..... *B60H 1/00207* (2013.01); *B60H 1/00371* (2013.01); *B60H 1/00542* (2013.01); *B60H 2001/00235* (2013.01)

(58) Field of Classification Search
   CPC ............ B60H 1/00207; B60H 1/00542; B60H 1/00371; B60H 2001/00235
   (Continued)

(56) References Cited

U.S. PATENT DOCUMENTS 2,182,569 A * 12/1939 Peo ...................... B60H 1/3229
                                                        62/241
4,672,818 A *  6/1987 Roth .................. B60H 1/00364
                                                        62/239
(Continued)

FOREIGN PATENT DOCUMENTS

DE          3224895       1/1984
DE          3344212       9/1985
(Continued)

OTHER PUBLICATIONS

European Search Report issued in corresponding European application No. 15151606.9, dated May 19, 2015.
(Continued)

*Primary Examiner* — Frantz F Jules
*Assistant Examiner* — Lionel Nouketcha
(74) *Attorney, Agent, or Firm* — Harness, Dickey & Pierce, P.L.C.

(57) ABSTRACT

The present disclosure discloses a rooftop air conditioning unit for a bus or other vehicle. The air conditioning unit includes a frame, a condenser section mounted on the frame and a HVAC section mounted on the frame. The condenser section is positioned along a central longitudinal axis of the air conditioning unit, and the HVAC section is positioned in a distributed way on the two opposite sides of the condenser section and comprises at least one pair of HVAC modules, each of which includes a box-shaped base of plastic material mounted on the frame, inside which a respective blower, evaporator and heater are mounted.

9 Claims, 5 Drawing Sheets

(58) Field of Classification Search
USPC .......................... 62/239, 244; 165/41, 42, 43
See application file for complete search history.

(56) References Cited

U.S. PATENT DOCUMENTS

| | | | |
|---|---|---|---|
| 5,005,372 A | 4/1991 | King | |
| 5,220,808 A * | 6/1993 | Mayer | B60H 1/00371 62/244 |
| 5,605,055 A * | 2/1997 | Salgado | B60H 1/00371 62/244 |
| 6,282,912 B1 | 9/2001 | Mannerheim | |
| 6,530,746 B2 | 3/2003 | Huang et al. | |
| 2002/0073723 A1 | 6/2002 | Hoos | |
| 2003/0035724 A1 | 2/2003 | Chen et al. | |
| 2008/0047289 A1* | 2/2008 | Patrick | B63J 2/04 62/285 |
| 2008/0256968 A1* | 10/2008 | Hassel | B60H 1/00371 62/244 |
| 2010/0006257 A1* | 1/2010 | Schutz | B60H 1/00371 165/61 |
| 2010/0024458 A1* | 2/2010 | Schmitt | B60H 1/00371 62/239 |
| 2010/0063635 A1* | 3/2010 | Liao | B60H 1/00371 700/276 |
| 2012/0227932 A1* | 9/2012 | Schaller | B60H 1/00371 165/42 |
| 2013/0185939 A1 | 7/2013 | Zapotocky et al. | |

FOREIGN PATENT DOCUMENTS

| | | |
|---|---|---|
| DE | 4415129 | 4/1995 |
| DE | 201 01 042 | 4/2001 |
| DE | 103 45 997 | 5/2005 |
| DE | 20 2008 002 054 | 4/2008 |
| DE | 10 2008 005539 | 1/2009 |
| EP | 0 257 569 | 3/1988 |
| EP | 1 340 634 | 9/2003 |
| WO | 2006/032377 | 3/2006 |
| WO | 2008/061519 | 5/2008 |
| WO | 2011/063916 | 6/2011 |

OTHER PUBLICATIONS

Search Report dated Sep. 5, 2014 in corresponding Italian Patent Application No. TO2014000031 with English translation.

\* cited by examiner

ROOFTOP AIR CONDITIONING UNIT FOR BUSES

CROSS-REFERENCE TO RELATED APPLICATIONS

This application claims the benefit and priority of Italy Patent Application No. TO2014A000031, filed Jan. 20, 2014. The entire disclosure of the above application is incorporated herein by reference.

DESCRIPTION

The present invention relates in a general way to air conditioning systems, and more particularly to a rooftop air conditioning unit for buses.

The current technologies used for bus applications require air conditioning systems designed integrally with the bus roof, and therefore each system has characteristics appropriate to a specific model of bus. In terms of both structure and performance, therefore, it is inconvenient to adapt an air conditioning system architecture designed for one model of bus to another model of bus with different characteristics. Furthermore, the currently used systems are rather heavy, making it relatively difficult to transport them and install them on vehicles.

Modular systems have been proposed in order to resolve the problem of adaptability. In some of these known systems, each module comprises a condenser system, with one or more condensers and corresponding fans, and an evaporator system with a corresponding blower.

These systems provide a partially satisfactory response to the requirements of adaptability, since an air conditioning system can be configured with different numbers of modules according to the required performance characteristics.

However, it should be noted that there is a need to develop a solution which is configurable for adaptation to an even wider range of installation situations.

Another problem of known modular systems is that they are still relatively heavy. Indeed, it is known that, in the transport industry, there is an ever-increasing demand for reduction of the weight of vehicle components, with the aim of reducing fuel consumption and exhaust emissions.

One object of the present invention is to propose a rooftop air conditioning unit capable of eliminating or at least mitigating the aforesaid problems.

This object is achieved according to the invention by a rooftop air conditioning unit for buses, having a plurality of modules and comprising:

a frame of metal material;
a condenser section mounted on said frame and having at least one condenser with a fan associated therewith for drawing outside air through said condenser and discharging the air to the outside; and
an HVAC section mounted on said frame and having at least one blower, at least one evaporator and at least one heater for conditioning air inside a passenger compartment of a bus;
wherein said condenser section is positioned along a central longitudinal axis of the air conditioning unit, and comprises at least one condenser module including a respective condenser with a fan associated therewith; and
said HVAC section is positioned in a distributed way on the two opposite sides of the condenser section, and comprises at least one pair of HVAC modules, each of which includes a box-shaped base of plastic material mounted on said frame, inside which a respective blower, evaporator and heater are mounted;
wherein the box-shaped bases of the HVAC modules are supported by and lie upon the frame.

The air conditioning unit according to the invention makes use of a considerable number of plastic parts, particularly as regards the content of the miscellaneous components. This makes it possible to reduce the overall weight of the system by comparison with the known solutions, with a consequent reduction of fuel consumption and exhaust emissions.

Furthermore, since the condensers are structurally independent of the modules of the HVAC section, the number of these modules is not related in a one-to-one way to the number of condensers and fans. It is therefore possible to provide architectures having different numbers of condensers and fans for a given number of HVAC modules. This enables the architecture of the air conditioning unit to be adapted in the best possible way to performance requirements.

Furthermore, the system according to the invention can use components procured from the motor industry, which are therefore lighter and have better performance, and it can be assembled by a production-line process.

Because of the aforementioned characteristics, the system according to the invention may also be transported in separate parts, for greater convenience, and then assembled by the vehicle manufacturer or by the installer of the air conditioning system.

Preferred embodiments of the invention are defined in the dependent claims, which are to be considered as an integral part of the present description.

Further characteristics and advantages of the air conditioning unit according to the invention will be revealed more fully by the following detailed description of an embodiment of the invention, given with reference to the attached drawings which are provided purely as non-limiting illustrations, in which:

FIG. 1 shows an air conditioning unit 10 according to the invention, for installation on the roof of a bus (not shown). Conventionally, electricity has to be supplied to the air conditioning unit 10 from a generator driven by the engine of the bus, via a power line (not shown).

The air conditioning unit 10 is interfaced with openings in the roof of the bus, so that blowers inside the air conditioning unit 10 cause the air in the passenger compartment to flow upwards into the air conditioning unit 10, where it is conditioned, and cause the conditioned air to flow downwards in supply conduits which carry the conditioned air into the passenger compartment.

Figure 1:
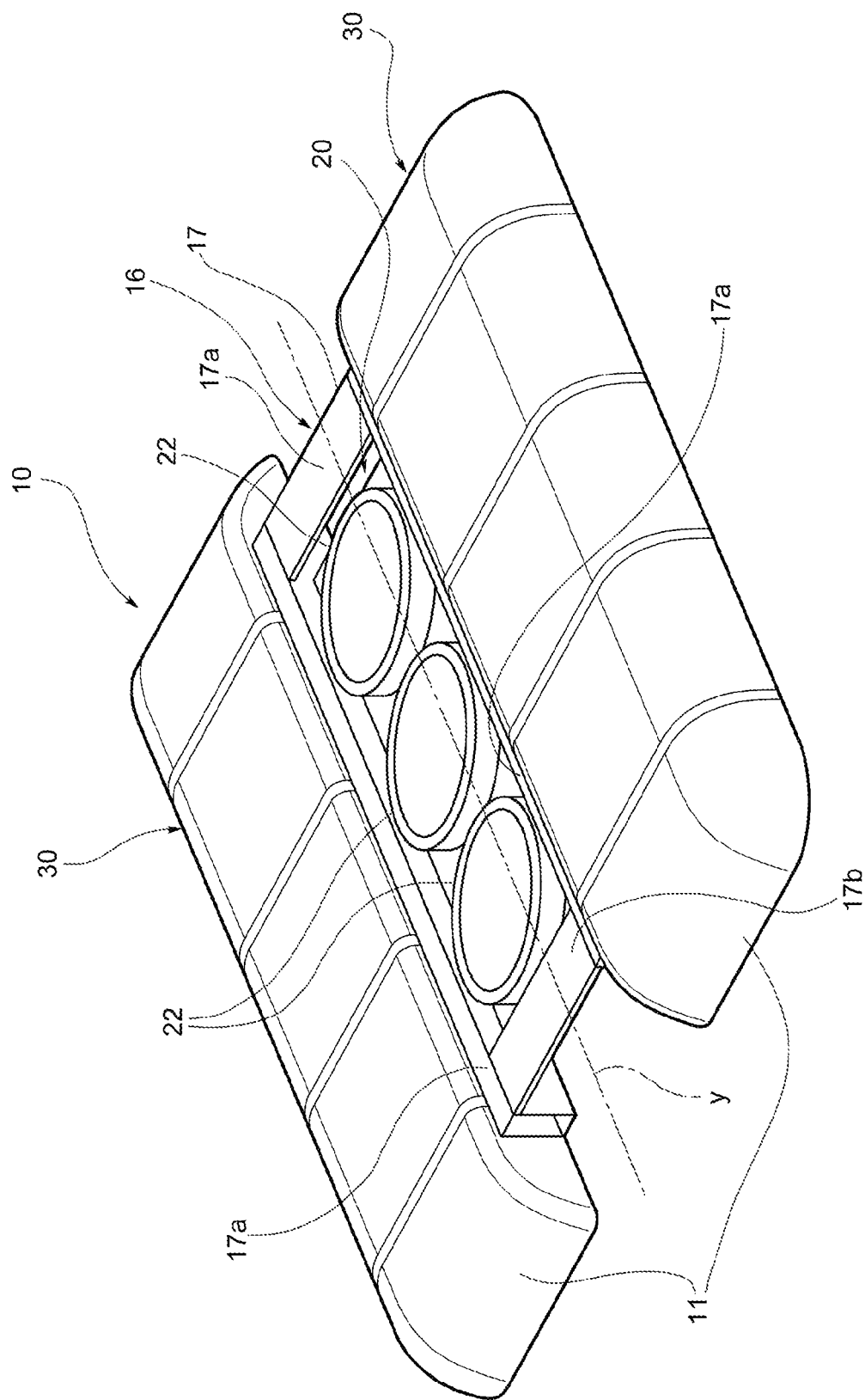
FIG. 1 is simplified perspective view of a rooftop air conditioning unit for buses according to the invention.
Figure 2:
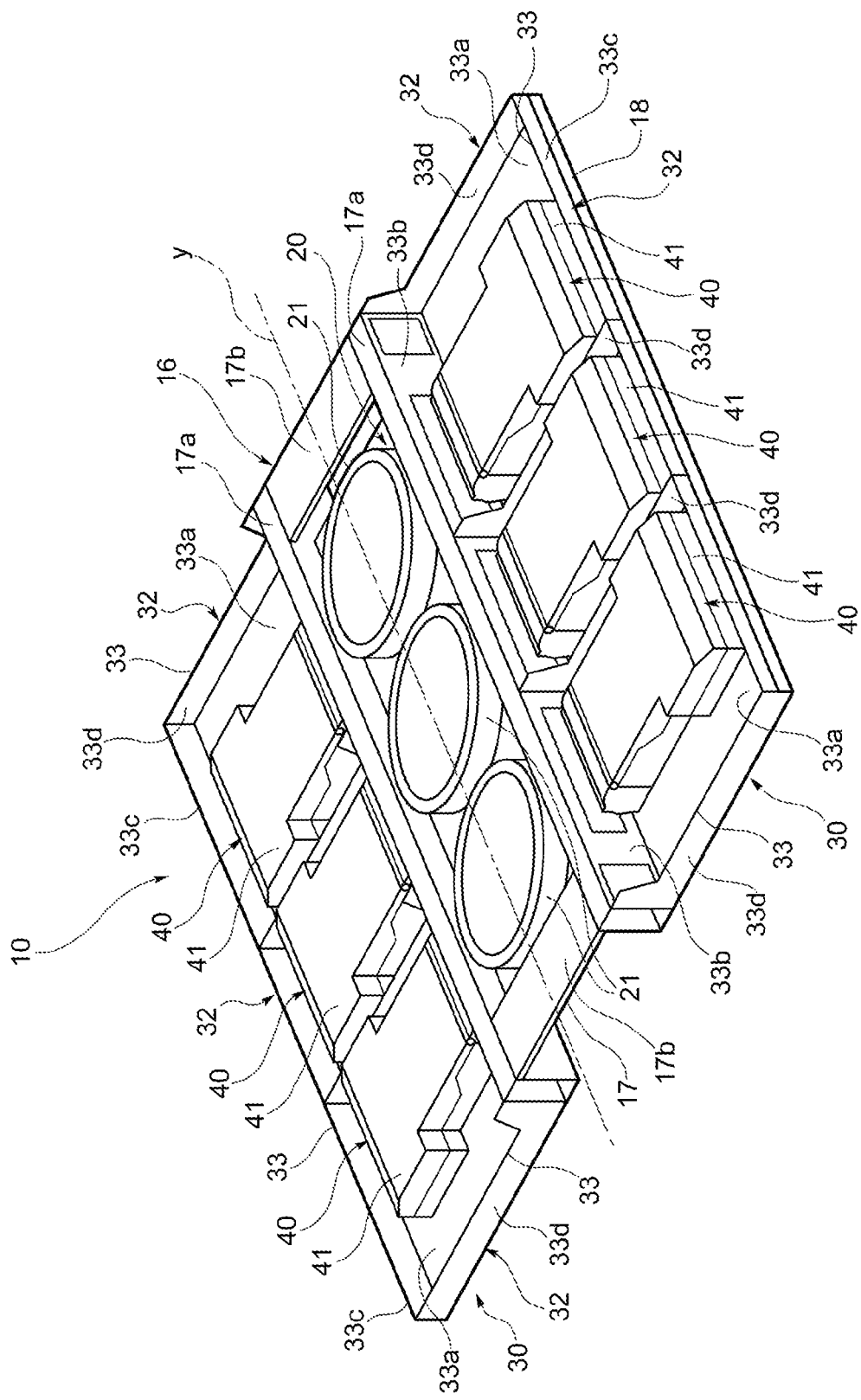
FIG. 2 is a simplified perspective view of the air conditioning unit of FIG. 1, without a cover.
Figure 3:
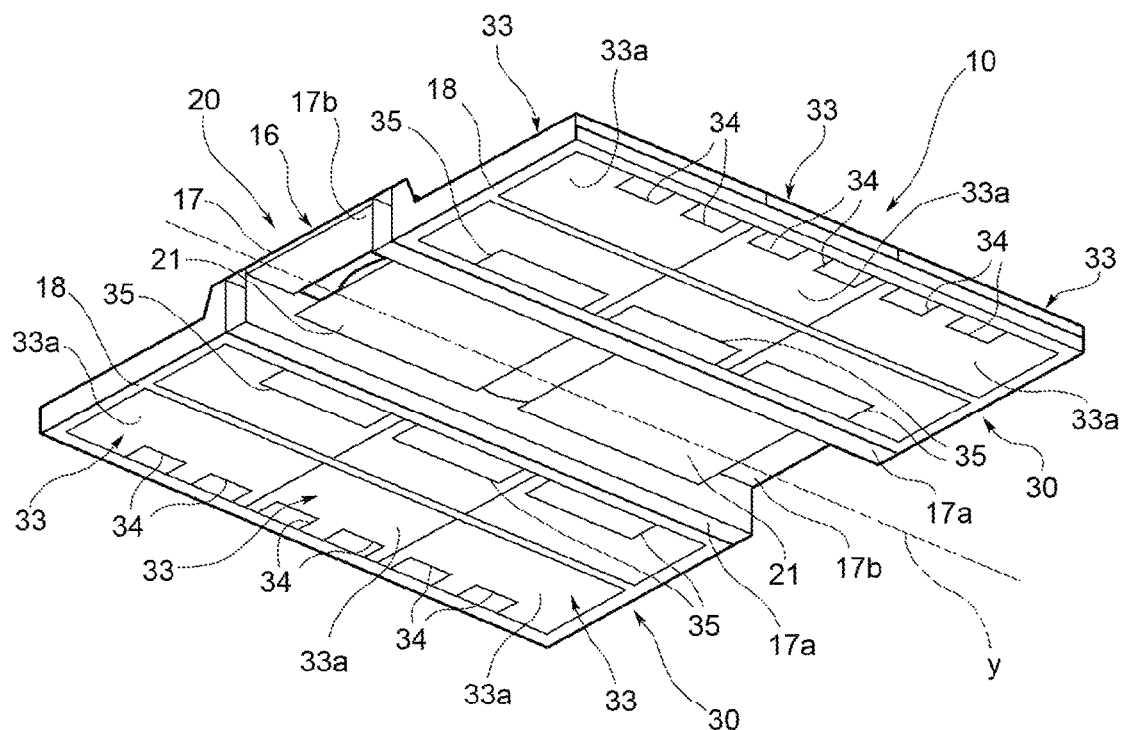
FIG. 3 is a simplified perspective view, from below, of the air conditioning unit of FIG. 1, without a cover.

In FIG. 1, the air conditioning unit 10 is shown with a cover 11, which has been removed in FIG. 2. FIGS. 1 to 3 and 6 show a frame 16 of metal material, to which the cover 11 is fixed. The frame 16 comprises a rectangular central part 17 and a pair of wings 18 extending laterally outwards from the rectangular central part 17. The central part comprises a pair of longitudinal frame elements 17a, which in the illustrated example have a hollow cross section, and a pair of transverse frame elements 17b which interconnect the longitudinal elements 17a. The wings 18 of the frame are connected to the longitudinal frame elements 17a.

The air conditioning unit 10 further comprises a condenser section 20 mounted on the frame 16 and having at least one condenser 21 (visible in FIG. 3) with a fan 22 associated therewith for drawing outside air through the condenser 21 and discharging the air to the outside. The condenser section 20 is supported and surrounded by the rectangular central part 17 of the frame. According to the required characteristics, a different number of condensers 21 and a different number of fans 22 may be positioned along the central longitudinal axis of the air conditioning unit 10. For example, two condensers 21 and three fans 22 are present in the illustrated configuration.

The air conditioning unit 10 further comprises an HVAC section 30 mounted on the frame 16 and having at least one blower, at least one evaporator and at least one heater for conditioning the air inside the passenger compartment of the bus. The air conditioning unit 10 also includes a power section (not shown) comprising at least one compressor and at least one inverter/controller. The methods by which the compressors, the evaporators of the HVAC section, and the condensers are connected in the coolant circuit are not the subject of the present invention. Similarly, the power supply and control methods for the air conditioning unit 10 are not the subject of the present invention.

The HVAC section 30 is positioned in a distributed way on the two opposite sides of the condenser section 20, and comprises at least one pair of HVAC modules 32, each of which includes a box-shaped base 33 of plastic material mounted on the frame 16, inside which a respective blower, evaporator and heater are mounted. The box-shaped bases 33 of the HVAC modules 32 are supported by and lie upon the wings 18 of the frame 16. According to the required characteristics, there may be a different number of HVAC modules 32, positioned adjacent to one another on each of the two opposite sides of the condenser section 20. For example, in the illustrated configuration there are three pairs of HVAC modules 32, in other words three modules on each side of the condenser section 20. Provision may be made for the modules positioned at the ends of the air conditioning unit 10 to have different geometries and to comprise additional equipment (such as compressors and inverters) relative to the intermediate modules.

Figure 4:
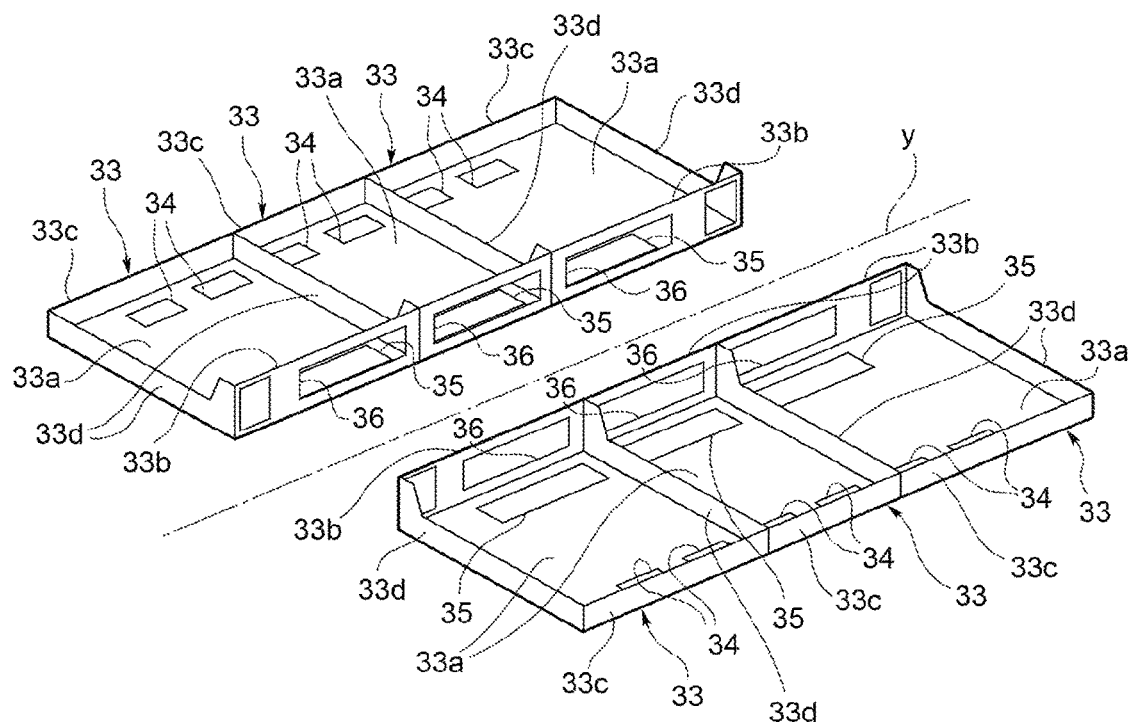
FIG. 4 is a simplified perspective view of containing boxes for HVAC units of the air conditioning unit of FIG. 1.

As can be seen in FIG. 4 in particular, each box-shaped base 33 has a substantially rectangular plan and comprises a bottom 33a and four side walls, in particular an inner longitudinal wall 33b, an outer longitudinal wall 33c and a pair of transverse walls 33d interconnecting the longitudinal walls. Preferably, the box-shaped base 33 is produced by injection moulding.

The box-shaped bases 33 are fixed to the longitudinal elements 17b of the central part 17 of the frame 16 by means of their respective inner longitudinal walls 33b, and to the wings 18 of the frame 16 by means of their respective bottoms 33a. Each box-shaped base 33 is also fixed to the adjacent box-shaped base 33 by means of the respective transverse walls 33d. Openings 34, 35 are formed in the bottom 33a of each box-shaped base 33. Other inlets 36 are formed in the inner longitudinal wall 33b of each box-shaped base 33.

Figure 5:
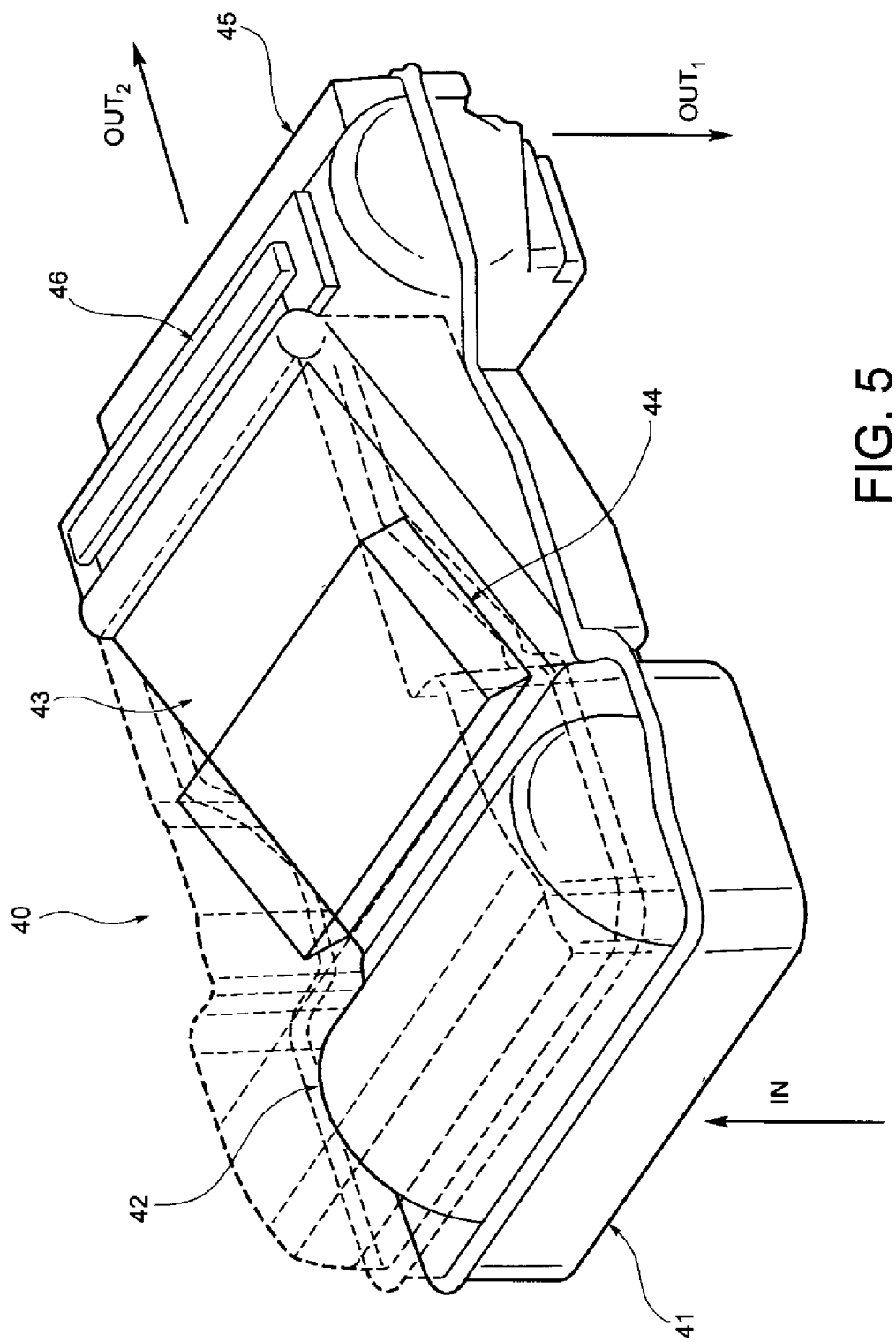
FIG. 5 is a simplified perspective view of a single HVAC unit of the air conditioning unit of FIG. 1.
Figure 6:
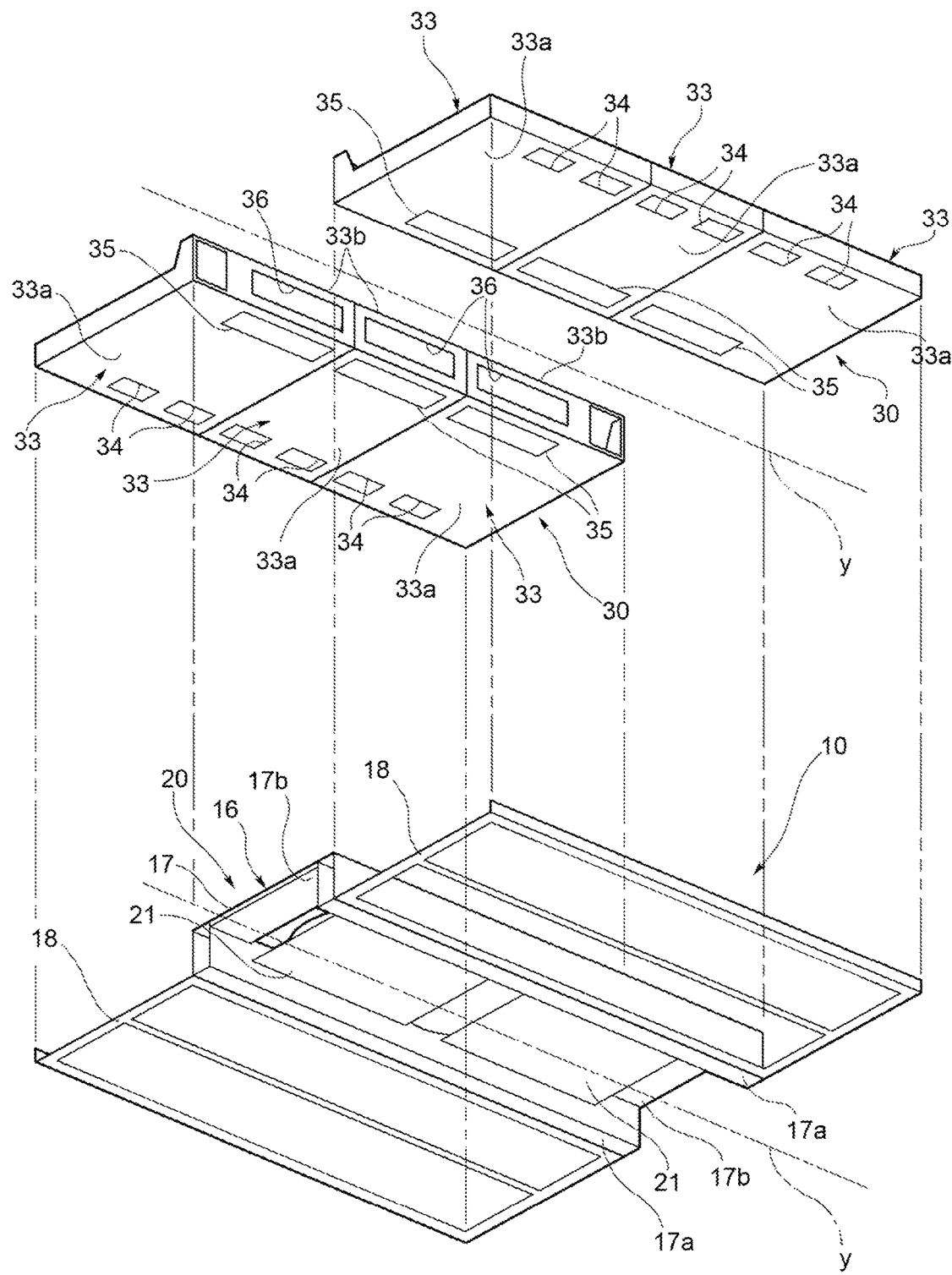
FIG. 6 is an exploded view of the air conditioning unit of FIG. 1, without a cover.

As shown in FIG. 2, within each HVAC module 32 there is provided an HVAC assembly 40 enclosed in a casing 41 of plastic material, which is fixed to the bottom 33a of the respective box-shaped base 33. Each HVAC assembly comprises a blower 42, an evaporator 43, a heater 44, an air distribution part 45 and an air filter 46. The blower 42 draws air from the outside and/or from the passenger compartment, the air being conveyed through the bottom of the casing 41 and through the openings 34 in the bottom 33a of the respective box-shaped base 33, as indicated by the arrow IN in FIG. 5. The methods for conveying the air to the blower are not the subject of the present invention.

The evaporator 43 is in fluid connection with the condenser(s) 21 in the coolant fluid circuit.

The blower 42 therefore impels the air drawn by it towards the evaporator 43 and the heater 44, in order to bring about the conditioning of this air.

The conditioned air is finally dispatched by the air distribution part 45, which is provided with moving parts, baffles, passages, etc. for this purpose. The outflow of the air, indicated by OUT1 in FIG. 5, takes place through the bottom of the casing 41 and the openings 35 in the bottom 33a of the respective box-shaped base 33. For this purpose, conduits may be provided to distribute conditioned air into predetermined areas of the passenger compartment of the bus. However, the methods for conveying the air to the passenger compartment are not the subject of the present invention. Another outflow of the air, indicated by $OUT_2$ in FIG. 5, takes place through a side wall of the casing 41. An inflow of the air takes place through the inlets 36 of the inner longitudinal wall 33b of the respective box-shaped base 33, and then through the adjacent longitudinal element 17a of the central part 17 of the frame.

What is claimed is:

1. A rooftop air conditioning unit for buses, having a plurality of modules and comprising:
    a frame of metal material, comprising a central part and a pair of wings extending laterally outwards from the central part;
    a cover fixed to said frame;
    a condenser section mounted on said frame and having at least one condenser with a fan associated therewith for drawing outside air through said condenser and discharging the air to the outside, wherein said central part of said frame surrounds and supports said condenser section; and
    an HVAC section mounted on said frame and having a plurality of HVAC assemblies for conditioning air inside a passenger compartment of a bus, each of said HVAC assemblies comprising a casing of plastic material and a blower, an evaporator and a heater enclosed in said casing;
    wherein said condenser section is positioned along a central longitudinal axis of the air conditioning unit and said HVAC section is positioned in a distributed way on the two opposite sides of the condenser section, said HVAC section comprising at least one pair of HVAC modules mounted on said frame,
    wherein each of the HVAC modules includes a box-shaped base of plastic material inside which a respective HVAC assembly is mounted, the box-shaped bases of the HVAC modules being supported by and lying upon the wings of the frame,
    wherein each casing of the HVAC assemblies is enclosed between said cover and the respective box-shaped base of the HVAC modules, wherein each box-shaped base comprises a bottom wall and is fixed to one of the wings of the frame by means of the bottom wall, and wherein each casing comprises a bottom and is fixed to the bottom wall of the respective box-shaped base.

2. The unit according to claim 1, wherein said central part of the frame is rectangular.

3. The unit according to claim 1, wherein each HVAC module has one or more air inlets and outlets formed on the bottom of the respective box-shaped base, and one or more air inlets formed on a side wall of the respective box-shaped base facing toward the condenser section.

4. The unit according to claim 1, comprising a plurality of said condensers and a plurality of fans positioned along the central longitudinal axis of the air conditioning unit.

5. The unit according to claim 1, comprising a plurality of said HVAC modules on each of the two opposite sides of the condenser section, positioned adjacent to one another.

6. The unit according to claim 1, wherein said wings are planar.

7. The unit according to claim 1, wherein said central part of the frame comprises a pair of longitudinal frame elements and a pair of transverse frame elements which inter-connect the longitudinal frame elements, wherein said wings of the frame are connected to the longitudinal frame elements.

8. The unit according to claim 7, wherein each box-shaped base comprises a bottom wall, an inner longitudinal wall, an outer longitudinal wall and a pair of transverse walls interconnecting the longitudinal walls, and wherein each box-shaped base is fixed to one of the longitudinal frame elements of the central part of the frame by means of the inner longitudinal wall, and to one of the wings of the frame by means of the bottom wall.

9. A rooftop air conditioning unit for a bus comprising:

a metal frame including a rectangular central part and a pair of wings each extending laterally outwards from the rectangular central part, the rectangular central part having a pair of longitudinal frame elements and a pair of transverse frame elements that interconnect the pair of longitudinal frame elements, each wing of the pair of wings being connected to a respective longitudinal frame element of the pair of longitudinal frame elements;

a cover attached to the metal frame;

a condenser section mounted to the metal frame and having at least one condenser and at least one condenser fan configured to draw outside air through the at least one condenser, the condenser section being located within the rectangular central part between the pair of longitudinal frame elements and between the pair of transverse frame elements;

a plurality of HVAC modules each having a plastic box-shaped base, the plastic box-shaped base having a bottom, an inner longitudinal wall, an outer longitudinal wall, and a pair of transverse walls interconnecting the inner longitudinal wall to the outer longitudinal wall, the bottom of the plastic box-shaped base of each HVAC module of the plurality of HVAC modules being fixed to, supported by, and located upon one of the wings of the pair of wings, the inner longitudinal wall of the plastic box-shaped base of each HVAC module of the plurality of HVAC modules being attached to one of the longitudinal frame elements of the pair of longitudinal frame elements, and each longitudinal frame element of the pair of longitudinal frame elements having at least one HVAC module of the plurality of HVAC modules attached thereto; and a plurality of HVAC assemblies for conditioning air inside a passenger compartment of the bus, each HVAC assembly of the plurality of HVAC assemblies having a plastic casing, a blower, an evaporator, and a heater, the blower, the evaporator, and the heater being enclosed in the plastic casing of the respective HVAC assembly, the plastic casing of each HVAC assembly of the plurality of HVAC assemblies being attached to the bottom of the plastic box-shaped base of a respective HVAC module of the plurality of HVAC modules, the blower of each HVAC assembly of the plurality of HVAC assemblies drawing air through a bottom of the plastic casing of the respective HVAC assembly and through an opening in the bottom of the plastic box-shaped base of the respective HVAC module of the plurality of HVAC modules, and the plastic casing of each HVAC assembly of the plurality of HVAC assemblies being enclosed between the cover and the plastic box-shaped base of the respective HVAC module of the plurality of HVAC modules.

* * * * *